(12) United States Patent
White

(10) Patent No.: US 6,568,694 B1
(45) Date of Patent: May 27, 2003

(54) ADJUSTABLE WORKHOLDING JAW ASSEMBLIES

(76) Inventor: Phillip A. White, 14980 Honeyhill La., Willis, TX (US) 77378

( * ) Notice: Subject to any disclaimer, the term of this patent is extended or adjusted under 35 U.S.C. 154(b) by 0 days.

(21) Appl. No.: 10/194,879

(22) Filed: Jul. 12, 2002

(65) Prior Publication Data (65)

(51) Int. Cl.$^7$ ............................................... B23B 31/16
(52) U.S. Cl. ...................... 279/133; 279/121; 269/224; 269/258
(58) Field of Search ................ 279/133, 123, 279/121, 122, 130, 131, 132; 269/258, 224

(56) References Cited

U.S. PATENT DOCUMENTS

| | | | |
|---|---|---|---|
| 1,812,006 A | | 6/1931 | Jellicoe |
| 2,690,915 A | * | 10/1954 | Pealer ........................ 279/114 |
| 2,893,744 A | * | 7/1959 | Anthony ..................... 279/123 |
| 3,380,747 A | * | 4/1968 | Hohwart et al. ............ 279/106 |
| 3,420,538 A | * | 1/1969 | Benjamin et al. .......... 279/4.01 |
| 3,771,804 A | | 11/1973 | Platt |
| 4,078,814 A | * | 3/1978 | Rohm ........................ 279/130 |
| 4,094,522 A | | 6/1978 | Hiestand |
| 4,527,808 A | | 7/1985 | Hiestand |
| 4,938,491 A | * | 7/1990 | Sumenko et al. ........... 279/133 |
| 5,522,608 A | | 6/1996 | Kitson et al. |

* cited by examiner

Primary Examiner—Steven C. Bishop
Assistant Examiner—Don J Bleasdell
(74) Attorney, Agent, or Firm—Mary J. Gaskin

(57) ABSTRACT

A combination of two or more jaw assemblies for mounting onto a self-centering power chuck to move an irregular workpiece to the axial centerline of the power chuck after it has been clamped. Each jaw assembly has a independent hydraulic system which, when activated, reduces the length of the jaw assembly, thereby moving the workpiece clamped in the power chuck. The imperfect pipe's average centerline can be moved to any location within the combined adjustable range of all the jaw assemblies. Each jaw assembly consists of a base jaw that is affixed to the power chuck, a connecting block that moves when the hydraulic system is actuated, a piston, a cylinder, and an interchangeable swivel insert with a serrated gripping surface.

9 Claims, 16 Drawing Sheets

ADJUSTABLE WORKHOLDING JAW ASSEMBLIES

FIELD OF THE INVENTION

The present invention relates to an assembly and method of positioning a workpiece, such as pipe, tubing or any other part that, when clamped, does not line up to the true centerline of a self-centering power chuck due to imperfections of roundness, wall thickness and straightness. The present invention will move the imperfect part's average centerline to the true centerline of the self-centering power chuck. The present invention uses at least two chuck jaw assemblies, each of which is adjustable by means of an independent internal hydraulic system.

BACKGROUND OF INVENTION

When a workpiece, such as pipe, tubing or another part to be machined (hereinafter simply referred to as "pipe") is clamped in a machine tool lathe for threading, it is usually held in place with a self-centering power chuck on the front and rear of the lathe, and the remaining length of the pipe or tubing is supported by rollers. Pieces of pipe or tubing, which come in various sizes and lengths, are not perfectly round or straight from end to end. These imperfections cause the surface area to be machined and threaded to run out from the true centerline of the self-centering power chuck.

Presently, the primary method of correcting the pipe's centerline runout is to insert shims between the chuck laws and the pipe or tubing. When a shim is used, the chuck must be opened allowing the pipe to move from the clamped position, and a shim must be placed in the correct location to adjust the part's average centerline with respect to the centerline of the power chuck. The shim must be held in place while the chuck is closed. This process may have to be performed repeatedly until the pipe is at an acceptable location. The process is dangerous and time consuming. In addition, the shim can also reduce the holding properties of the chuck jaw's gripping surface, which could cause the pipe to slip or move during the machining process.

Other methods for correcting the runout include the use of specialized chucks such as a self-compensating chuck or a sequencing chuck. In both cases, the machine operator has less control of the pipe's location. A self-compensating chuck, which relies on an external locating device to hold the pipe in place before the pipe is clamped by the chuck, does not always locate the pipe in an acceptable location due to the various imperfections of the pipe. Also, the weight of the pipe has some negative effects on the external locating device. A sequencing chuck has a locating device built into the chuck that retracts into the chuck body after the part is located and clamped. This chuck is very expensive and also has the same locating problems with the various imperfections of the pipe described above. In addition, when these specialized chucks are used the jaws and the locating device must be changed for each size pipe to be machined, increasing the time and cost to set up the specialized chucks.

None of the present methods provides an economical method of locating a pipe for machining.

SUMMARY OF THE INVENTION

The present invention overcomes the problems present in the prior art by providing a means for clamping a pipe, then adjusting the imperfect pipe's average centerline by moving one or more of the chuck jaw assemblies by activating its independent, closed hydraulic system in order to adjust the length of the chuck jaw assembly. As the length of a chuck jaw assembly is reduced, the imperfect pipe's average centerline moves toward that chuck jaw assembly and all the other chuck jaws follow the pipe due to the dynamic clamping properties of a power chuck. On a power chuck with two or more jaws, the imperfect pipe's average centerline can be moved to any location within the combined adjustable range of all the jaw assemblies.

The jaw assemblies of the present invention can be mounted onto the power chuck's master jaw or can incorporate the master jaw as combined assemblies.

Each jaw assembly consists of a base jaw that is affixed to the chuck, a connecting block that moves when the hydraulic system is actuated, and an interchangeable swivel insert with a serrated gripping surface. The swivel insert, which is sized according to the diameter of the pipe being machined, compensates for the roundness imperfections of the pipe and reduces the distortion of the pipe caused by the clamping pressure of the chuck by equally distributing the forces across the entire gripping surface of the swivel insert. Each of the swivel inserts for the jaw assemblies is attached to the connecting block with a single bolt so that it can be quickly changed, depending on the diameter of the pipe being machined.

To activate the invention, the chuck must be clamped on the pipe to be machined. The clamping force of the chuck pressurizes the hydraulic system in each jaw assembly. The hydraulic system consists of a single action cylinder, which is built into the connecting block; a piston, which is affixed to the base jaw; a diverting ball valve assembly; two reservoirs; and a check valve assembly. In the unclamped position, the cylinder is completely extended and full of hydraulic oil. In the clamped position, the hydraulic oil in the cylinder is pressurized. With the hydraulic oil under pressure in the cylinder, a fixed amount of the hydraulic oil is removed from the cylinder by the diverting ball valve. The diverting ball valve has three ports: one port to the cylinder; one port to a spring-loaded fixed area reservoir, which is always open to the center of the ball passage, and one port to a spring-loaded hydraulic oil holding reservoir. When the ball valve is turned, opening the passage from the cylinder through the ball, a fixed amount of hydraulic oil fills the spring-loaded fixed area reservoir, reducing the distance between the base jaw and the swivel insert. The measure of the distance reduced is set by the volume of hydraulic oil held in the spring loaded fixed area reservoir, which is adjustable. The resulting reduction in length of the jaw assembly moves the pipe clamped by the chuck jaws toward that particular jaw. When the ball valve is turned to open the passage to the spring-loaded hydraulic oil holding reservoir, since the minimum spring pressure of the spring-loaded fixed area reservoir is greater than the maximum spring pressure of the spring-loaded hydraulic oil holding reservoir, all of the hydraulic oil from the fixed area reservoir is forced into the hydraulic oil holding reservoir, ending one adjustment cycle. Each jaw assembly can be adjusted in the same fashion in order to move the clamped pipe to any location within the adjustable range of the combined jaw assemblies. The number of cycles which one jaw assembly can be adjusted depends on the volume of hydraulic oil in the cylinder.

When the pipe is unclamped from the chuck, the spring pressure of the spring loaded hydraulic oil holding reservoir forces all the hydraulic oil back to the cylinder through a check valve. This action restores the original length of each of the jaw assemblies for the next pipe to be clamped.

The jaw assemblies could also be activated by an external mechanical device controlled by a machine tools computer program, resulting in a completely automated process. In that event a spool valve rather than a diverting ball valve would be used.

DESCRIPTION OF THE PREFERRED EMBODIMENT

Figure 1A:
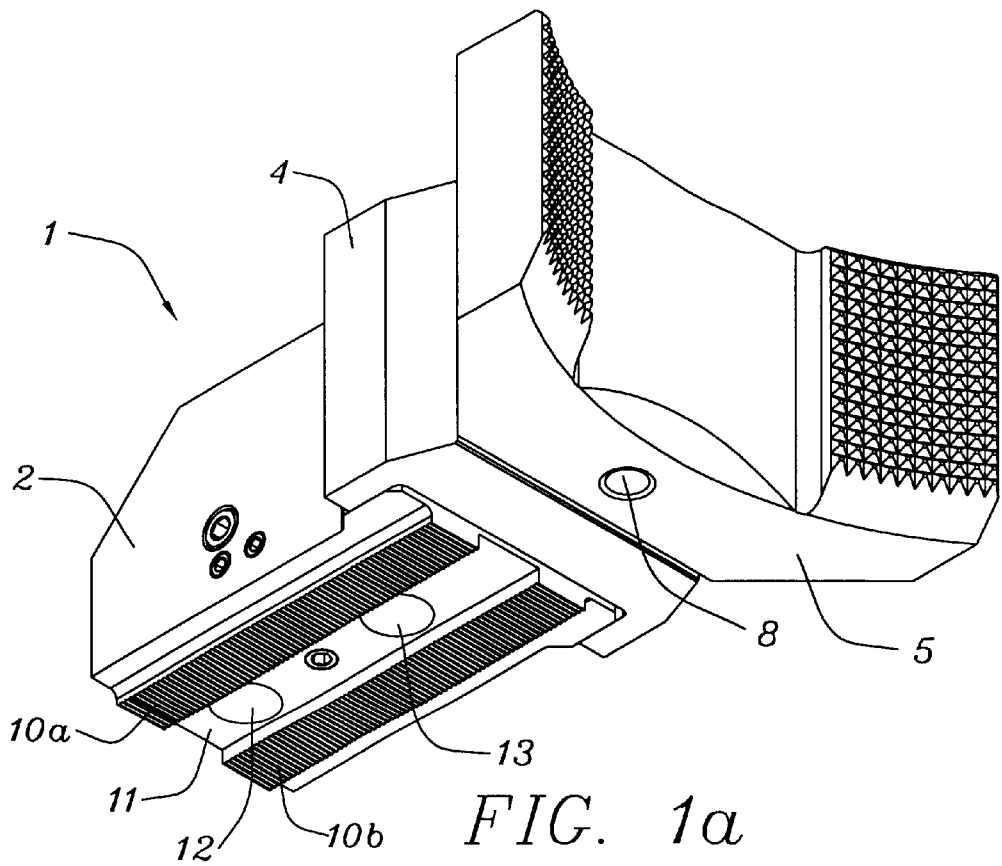
FIG. 1a is an isometric bottom view of the jaw assembly of the present invention.
Figure 1B:
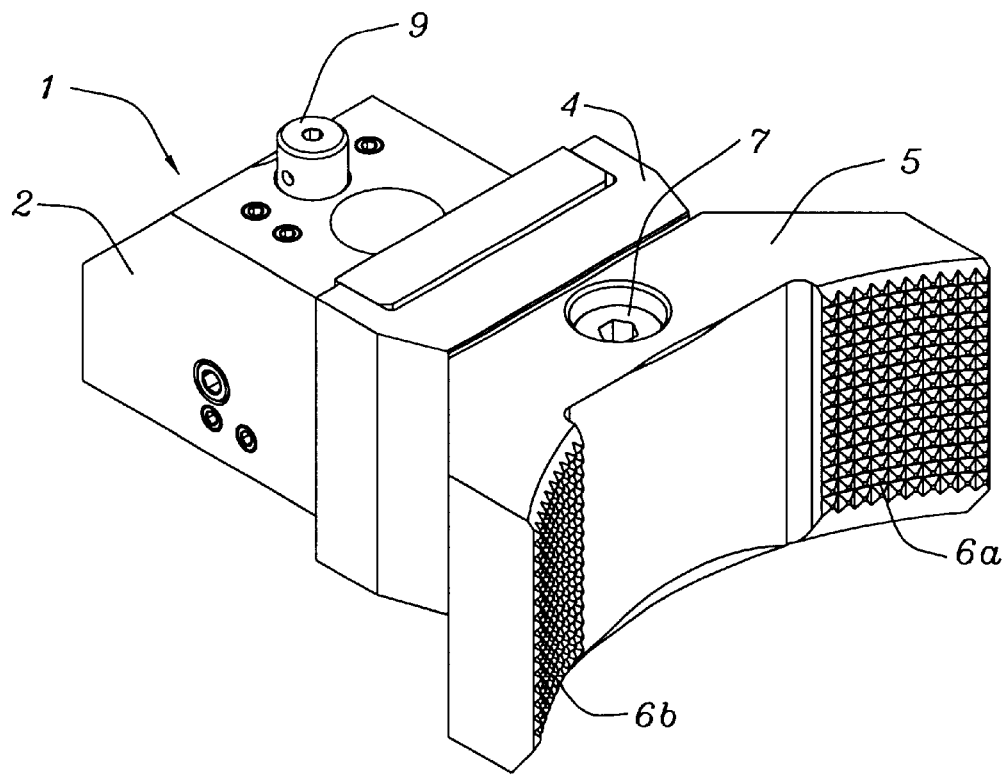
FIG. 1b is an isometric top view of the jaw assembly of the present invention

As shown in FIGS. 1a and FIG. 1b, each jaw assembly 1 of the present invention has a base jaw 2, a piston 3 (not visible), a connecting block 4, and a swivel insert 5. The base jaw 2 will be affixed to a power chuck 20 (not shown) in typical fashion. A swivel insert 5 is attached to the connecting block 4 by shoulder bolt 7, which fits into threaded hole 8, allowing the swivel insert 5 to rotate about the axis of the shoulder bolt 7. The swivel insert 5 can be interchanged with other inserts, depending on the pipe diameter to be machined. Gripping surfaces 6a, 6b make contact with the surface of the pipe to be machined, in order to prevent slippage. On the bottom of the base jaw 2 are locating surfaces 10a and 10b, which mate to a power chuck 20 (not shown), and a groove, or locating keyway 11, to align the jaw assembly 1 to the power chuck 20 (not shown). Fixing holes 12 and 13 are used to bolt the jaw assembly 1 to the power chuck 20 (not shown). The locating surfaces 10a, 10b and the locating key way 11 on jaw assembly 1 vary in configuration depending on the type and model of the power chuck used. The actuator knob 9 is turned, using a hex wrench, to actuated internal hydraulic system.

Figure 2:
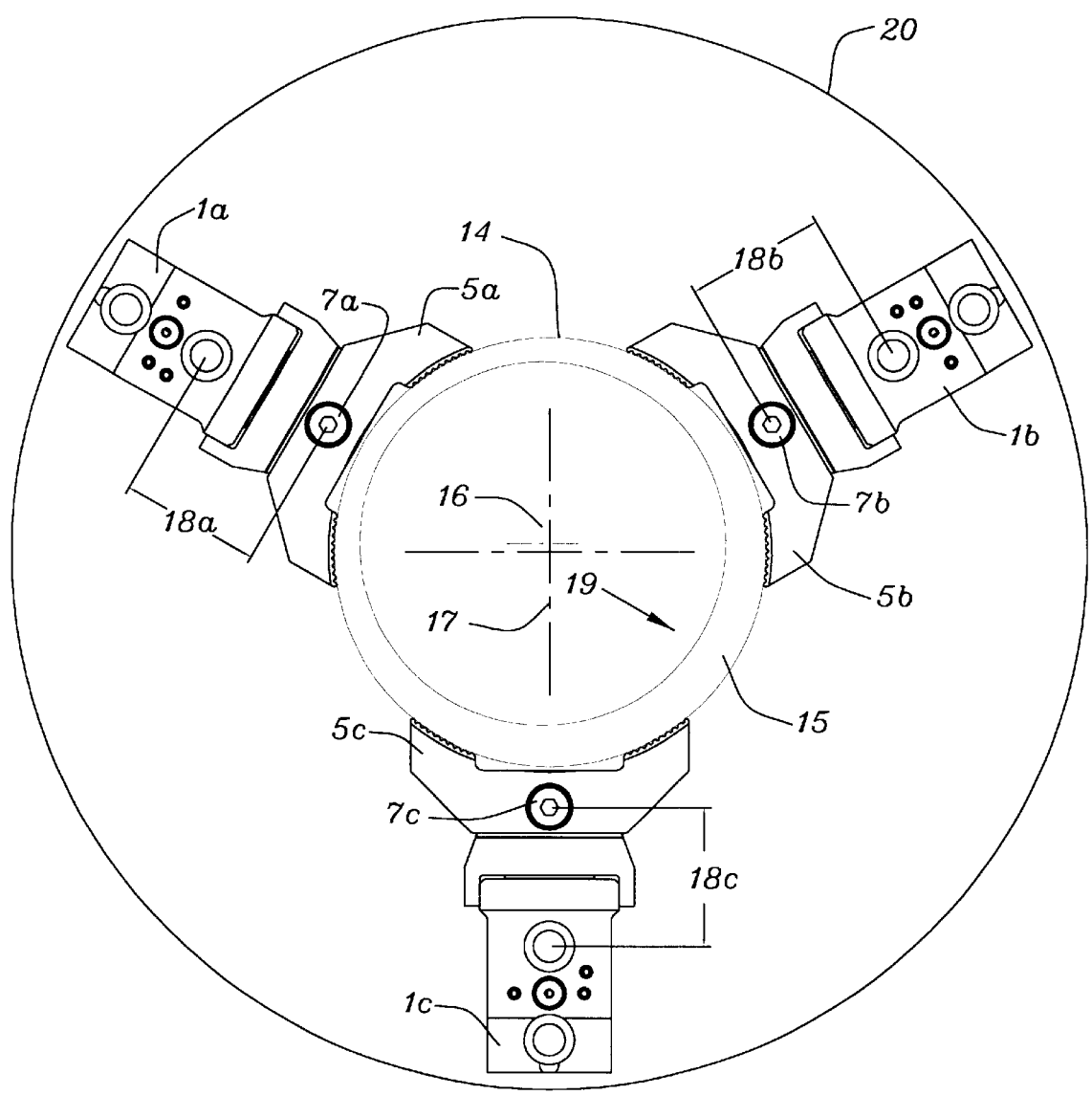
FIG. 2 is a view of an imperfect pipe that is clamped by three jaw assemblies of the present invention mounted on a power chuck.

FIG. 2 shows a typical imperfect pipe 14 that is clamped by a power chuck 20 using the jaw assemblies 1a, 1b and 1c of the present invention. The chuck centerline 17 is the center of rotation of the power chuck 20, the cutting centerline of the machine tool lathe. The pipe centerline 16 is the average center of the imperfect pipe 14, which varies from the chuck centerline 17 due to the variation in wall thickness 15. The present invention is designed to move the pipe 14 to the optimum location before machining by reducing the mid-length 18b of jaw assembly 1b and the mid-length 18c of jaw assembly 1c, without changing the mid-length 18a of jaw assembly 1a. These adjustments will move the pipe 14 in the direction 19, which moves the pipe centerline 16 to the same location as the chuck centerline 17, the optimum location for machining the pipe 14. The swivel inserts 5a, 5b, 5c are able to rotate about the axes of shoulder bolts 7a, 7b, 7c, respectively.

Figure 3:
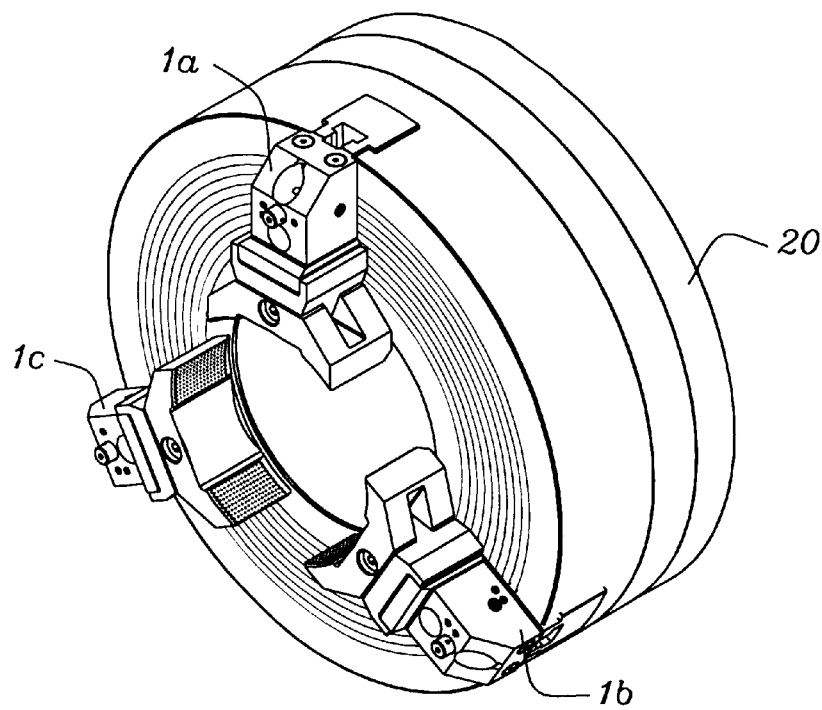
FIG. 3 is an isometric view of the jaw assemblies of the present invention mounted on a power chuck.
Figure 4:
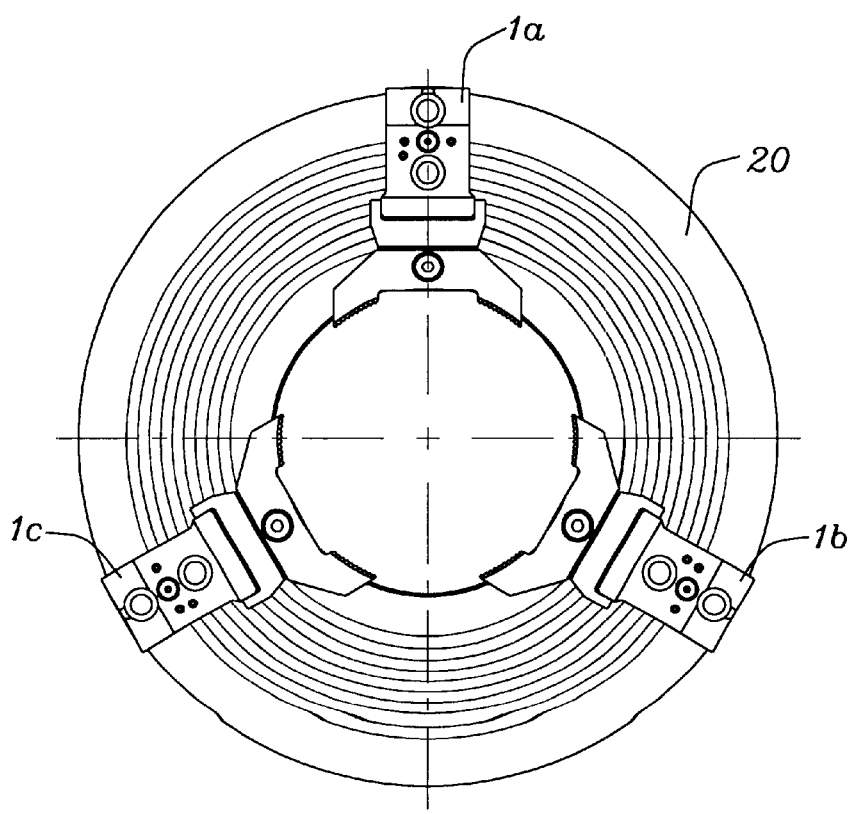
FIG. 4 is a top view of the jaw assemblies of the present invention mounted on a power chuck.

In FIG. 3 and FIG. 4, three of the jaw assemblies 1a, 1b, 1c have been mounted onto a three jaw, self-centering power chuck 20.

Figure 5:
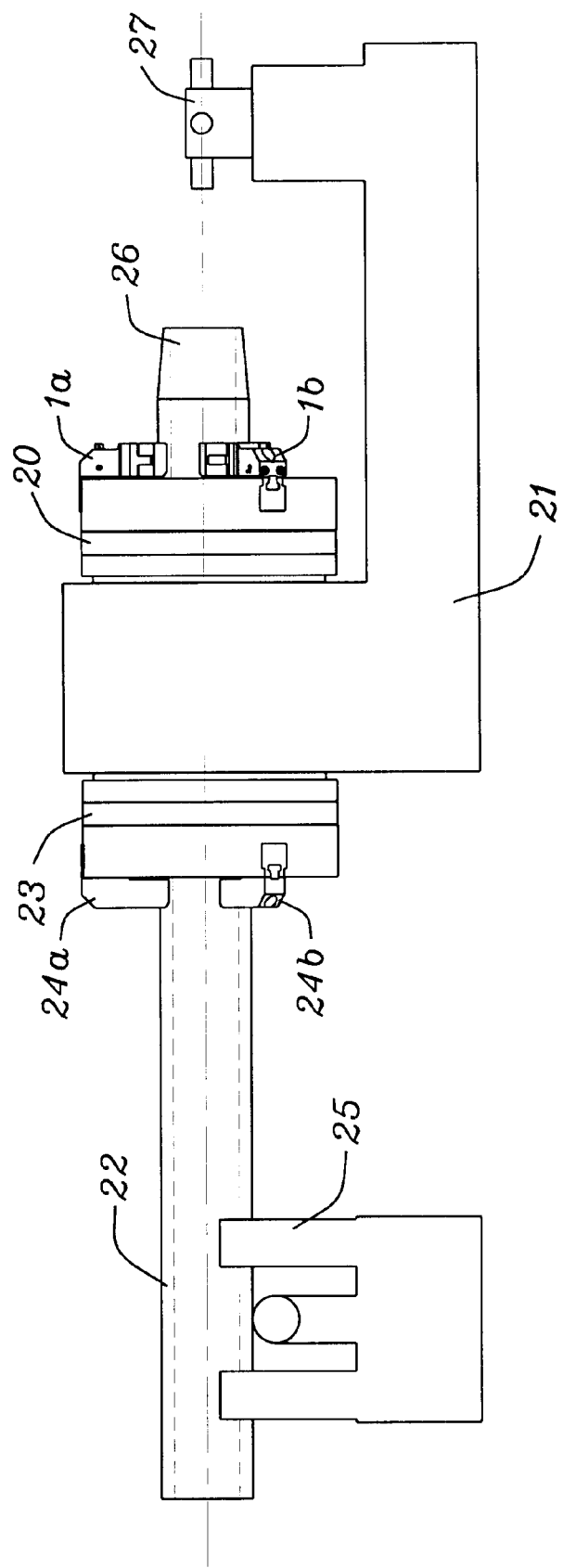
FIG. 5 is a diagrammatic view of the jaw assemblies of the present invention mounted on a power chuck, holding a pipe on a machine tool lathe.

FIG. 5 shows the jaw assemblies 1a, 1b, (1c) of the present invention used in conjunction with a machine tool lathe 21. The assemblies 1a, 1b, (1c) are mounted onto the power chuck 20, which holds a pipe 22 to be machined. The pipe 22 is supported by standard work holding jaws 24a, 24b (24c) on a rear chuck 23 and roller device 25. The surface to be machined 26 will be cut by the cutting tool in tool holder 27.

Figure 6:
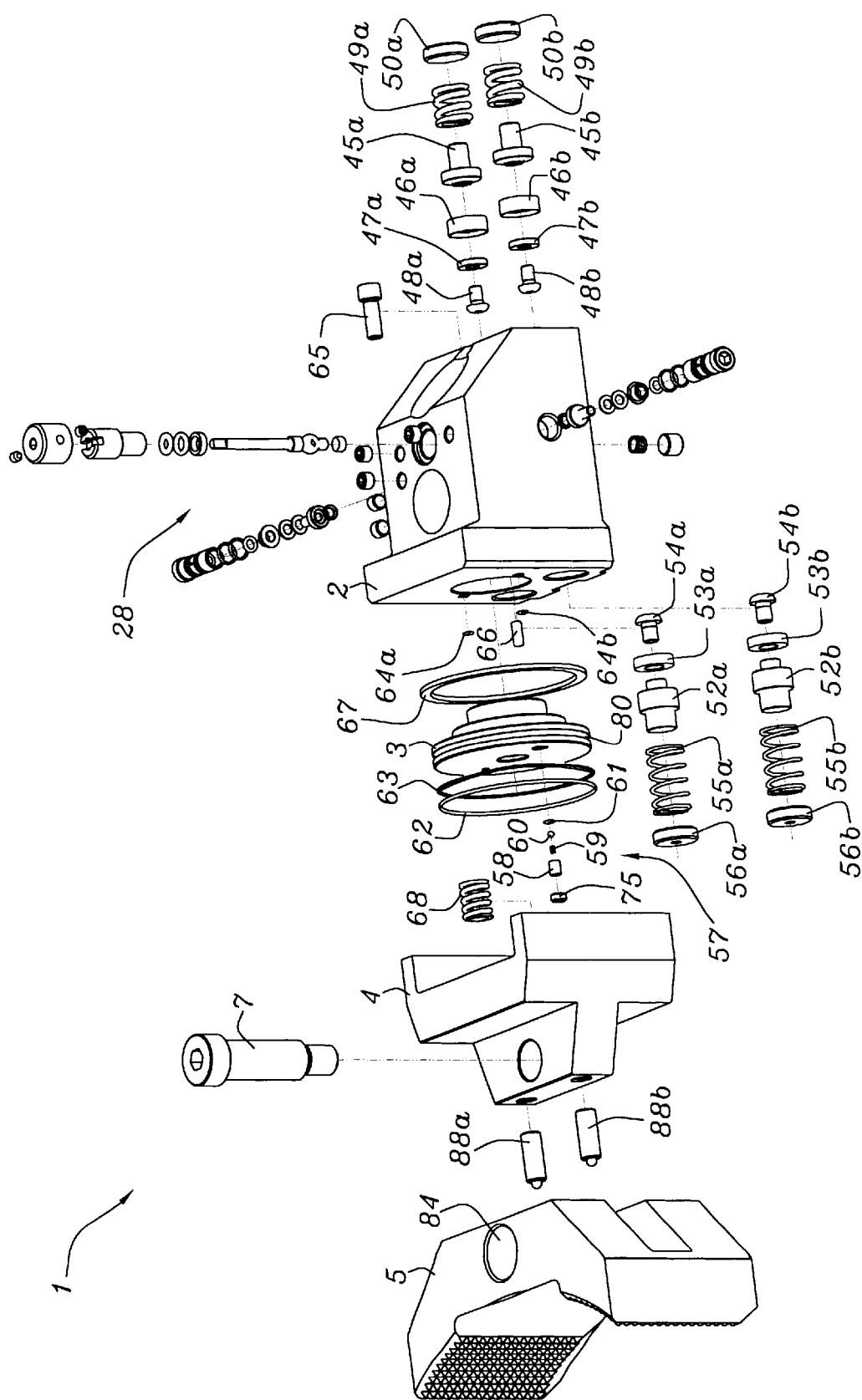
FIG. 6 is an exploded view of the jaw assembly of the present invention.

The exploded view of FIG. 6 shows all the parts of the jaw assembly 1 of the present invention. The base jaw 2 is the main valve body of the hydraulic system. The internal parts of the base jaw 2 are the diverting ball valve assembly 28, the metering pistons 45a, 45b, cup seals 46a, 46b, washers 47a, 47b, button head cap screws 48a, 48b, compression springs 49a, 49b and adjusting caps 50a, 50b, the holding pistons 52a, 52b, cup seals 53a, 53b, button head cap screws 54a, 54b, compression springs 55a, 55b and caps 56a, 56b. Also shown are the piston 3, and a spring-loaded check valve assembly 57, which consists of a check valve cage 58, compression spring 59, ball 60, O-ring 61 and hollow setscrew 75. O-ring 62 and backup ring 63 in groove 80 is the dynamic seal for piston 3. O-ring 64a, 64b seal the hydraulic oil passages 78 (not seen) and 79 (not seen) in the piston 3 to the hydraulic oil passages 72 (not seen) and 73 (not seen) in the base jaw 2. The piston 3 is located from hole 76 (not seen) to the base jaw 2 with dowel pin 66 to hole 71 (not seen) and fixed with socket head cap screw 65 through hole 69 (not seen) in base jaw 2 to hole 77 (not seen) in piston 3. Spring 68 forces the connecting block 4 away from piston 3 and spiral retainer ring 67 holds connecting block 4 to piston 3. The swivel insert 5 is attached to the connecting block 4 through hole 84 with shoulder bolt 7, which is affixed to hole 8, allowing the swivel insert 5 to rotate about the axis of the shoulder bolt 7. When not in contact with a clamped pipe, the swivel insert 5 is centralized by spring plunger 88a, 88b.

Figure 7:
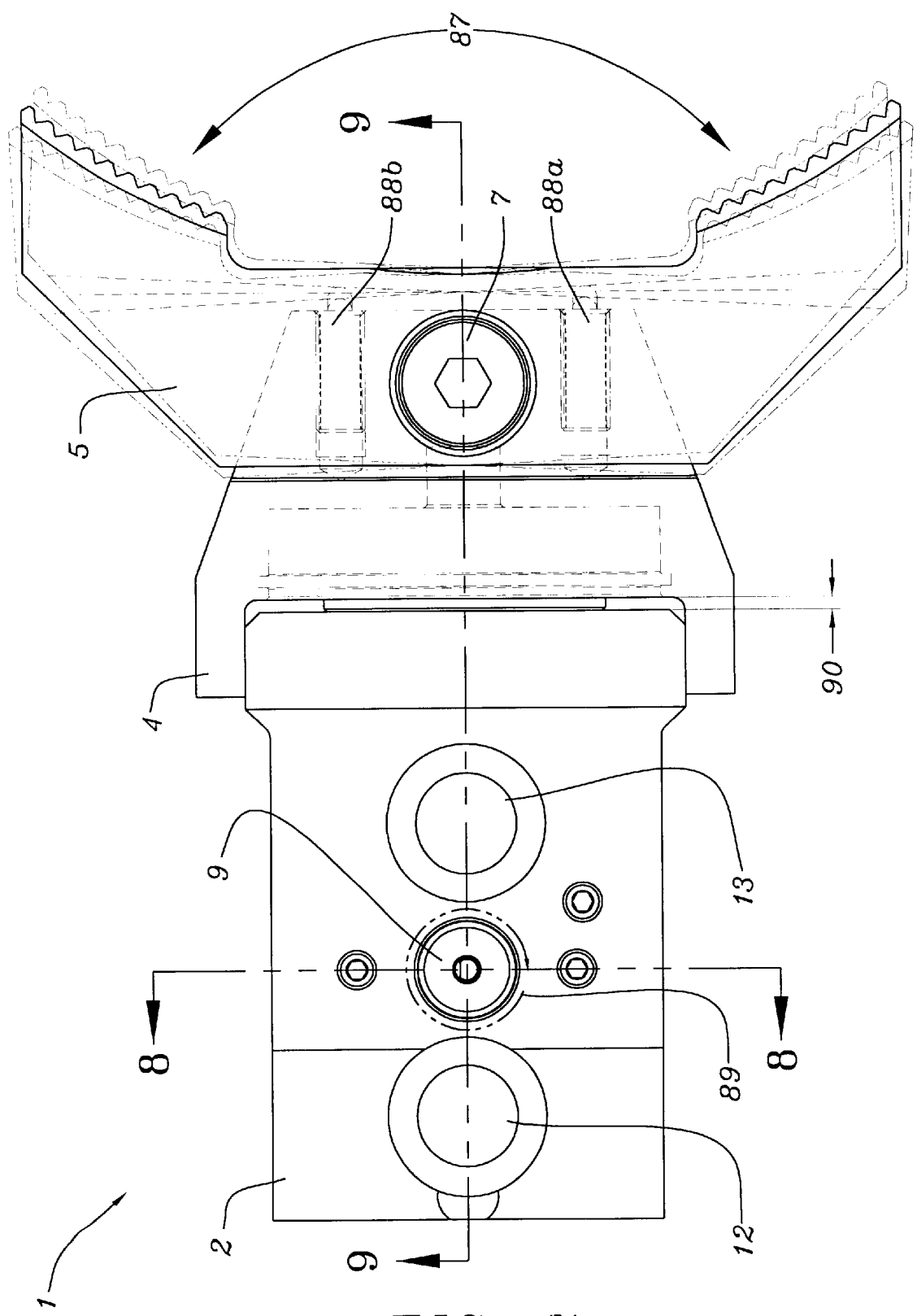
FIG. 7 is a top view of the jaw assembly of the present invention showing its moveable parts.

FIG. 7 shows the moving parts of the jaw assembly 1. The motion line 87 shows the swivel of the swivel insert 5 about the axis of the shoulder bolt 7. The swivel insert is centralized by spring plunger 88a, 88b when not in contact with the clamped pipe (not shown), thereby maintaining the maximum contact between the swivel insert 5 and the part to be machined. The rotating movement 89 shows the movement to actuate the hydraulic system namely turning the actuator 9. The distance 90 represents the distance between the base jaw 2 and the connecting block 4, which is changed by actuating the hydraulic system, thereby moving a clamped pipe (not shown). Also shown are cutting line 8 and cutting line 9.

Figure 8:
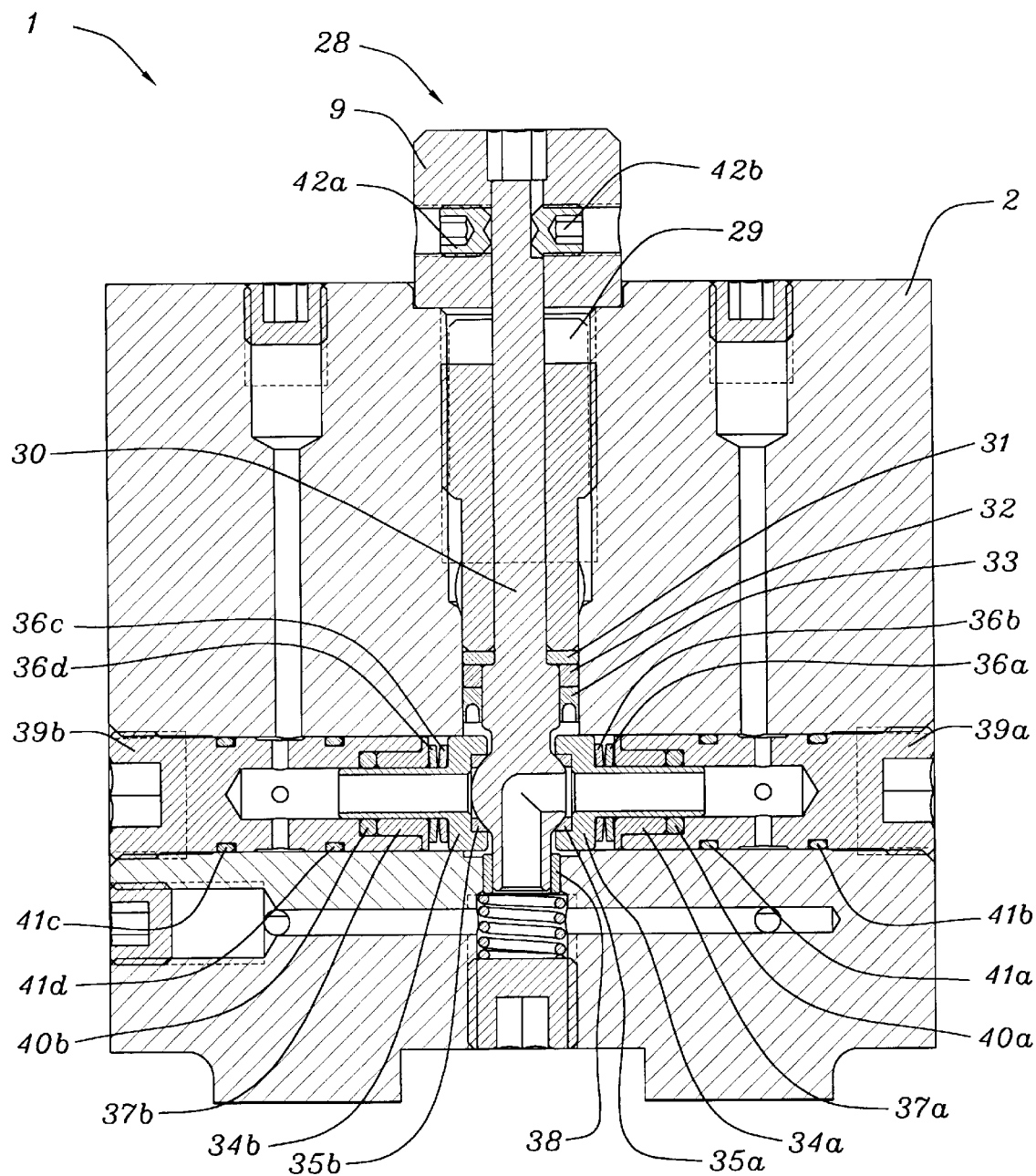
FIG. 8 is a sectional view of the ball valve assembly of the hydraulic system within each jaw assembly of the present invention.

FIG. 8 is a sectional view showing the ball valve assembly 28 of the hydraulic system inside each jaw assembly 1. The ball valve assembly 28 is comprised of valve stem 30, which when rotated diverts the flow of hydraulic oil through the valve assembly 28. A hex wrench is used to rotate the actuator 9, which is affixed to the valve stem 30 by two setscrews 42a and 42b, thereby rotating the valve stem 30. The valve stem 30 is sealed by the stem seal 33, set in place by spacer 32 and the two peek seals 35a and 35b. The coefficient of friction to rotate the valve stem 30 is reduced by the plane bearing 38 and the thrust washer 31 against packing gland 29. The peek seals 35a and 35b are set in place by the valve set retainers 34a and 34b. The valve set retainers 34a and 34b are set in place by the backup rings 37a and 37b and seat glands 39a and 39b. The valve set retainers 34a and 34b are spring loaded by spring washers 36a, 36b, 36c and 36d, which maintain constant force on peek seals 35a and 35c to the ball on valve stem 30. The seat glands 39a and 39b are sealed by O-rings 40a, 40b, 41a, 41b, 41c, and 41d.

Figure 9:
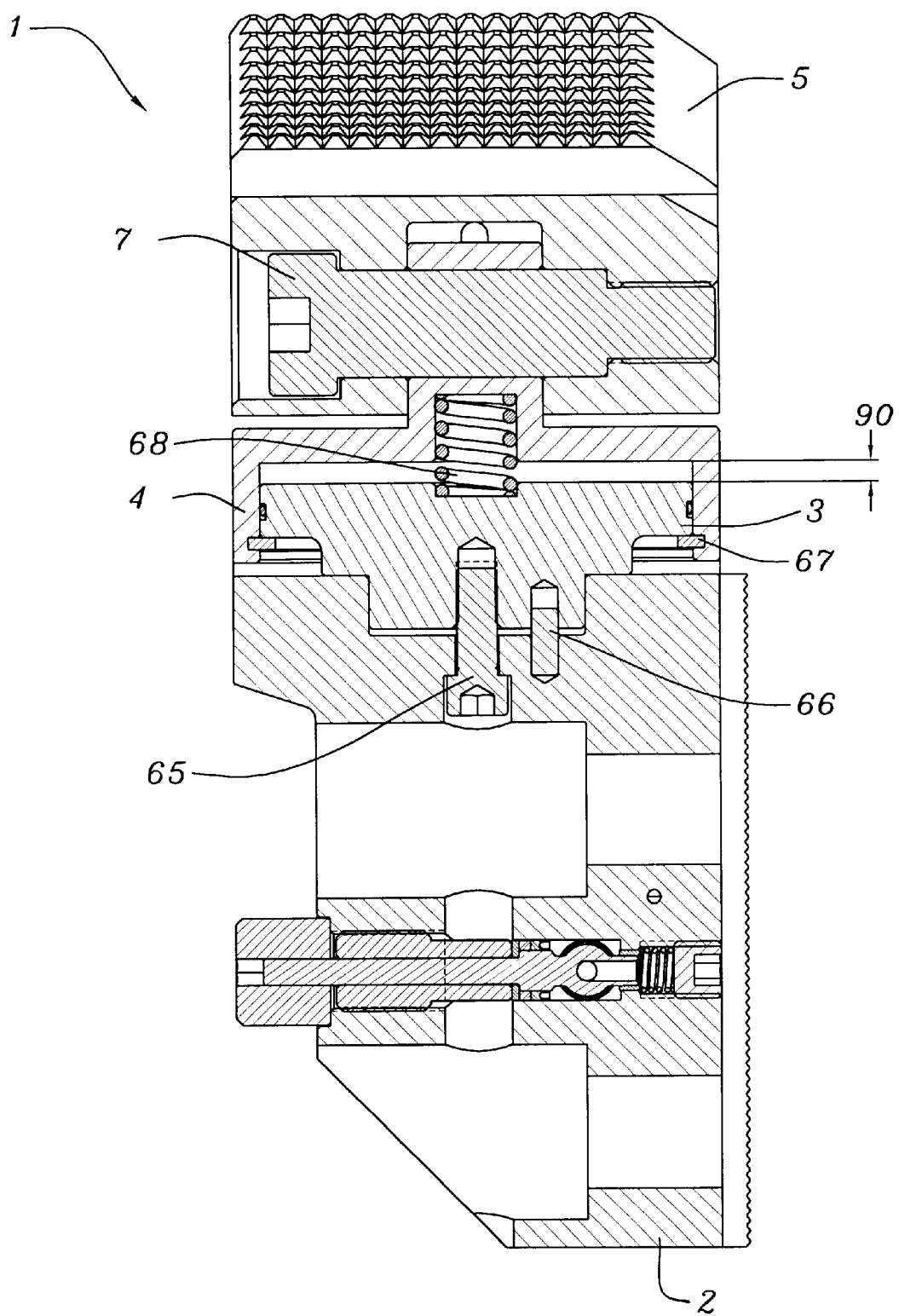
FIG. 9 is a sectional view of the jaw assembly of the present invention.

The sectional view of the jaw assembly 1 in FIG. 9 shows the base jaw 2 located to the piston 3 with the dowel pin 66 and fixed in place with socket head cap screw 65. Connecting block 4 held on to the piston 3 with the spiral retainer ring 67. Spring 68 sets the distance 90 to the maximum position. An interchangeable swivel insert 5 is fixed to connecting block 4 with shoulder bolt 7.

Figure 10:
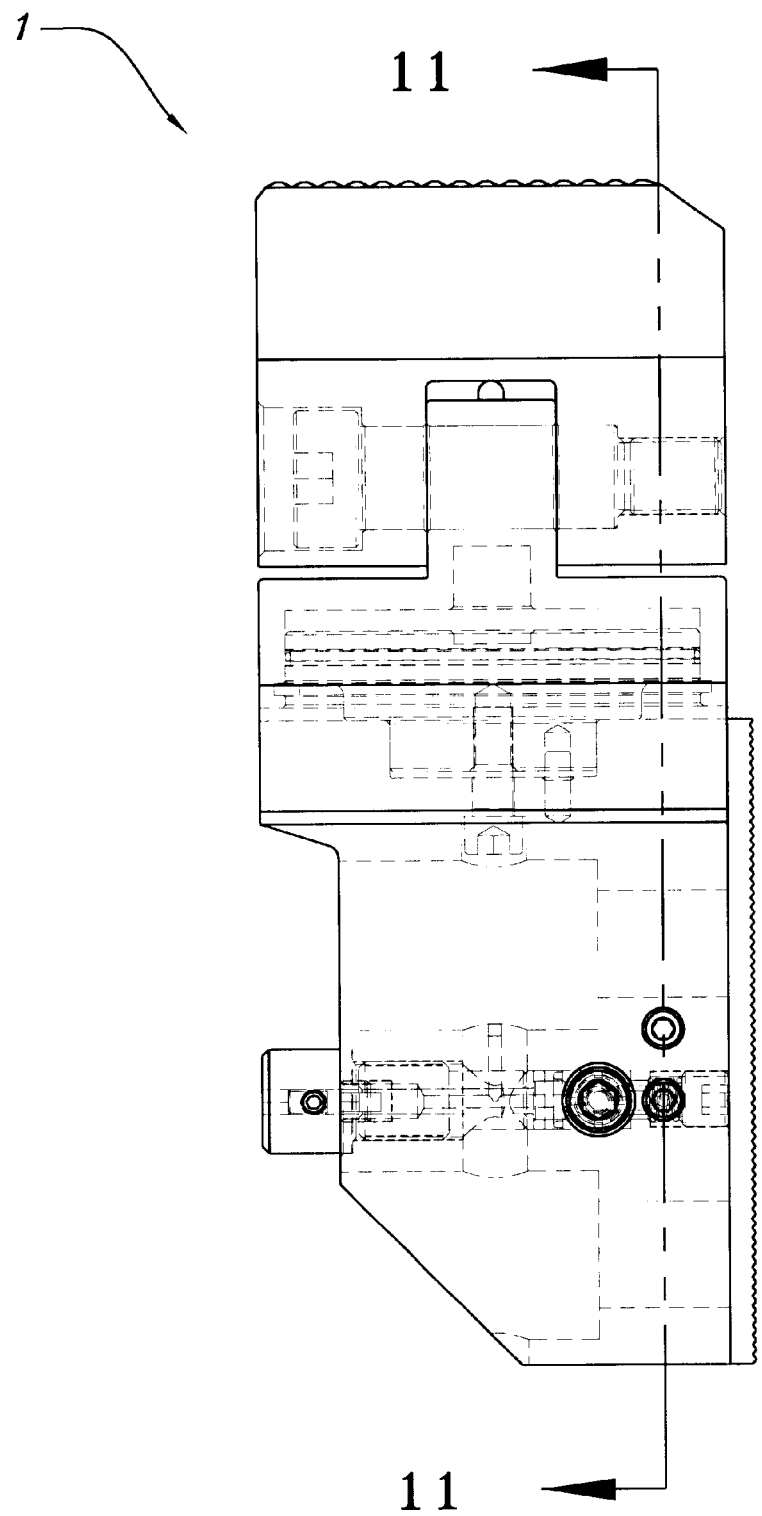
FIG. 10 is a side view of the jaw assembly of the present invention.

FIG. 10 is a side view of the assembly 1, showing the cutting line 11.

Figure 11:
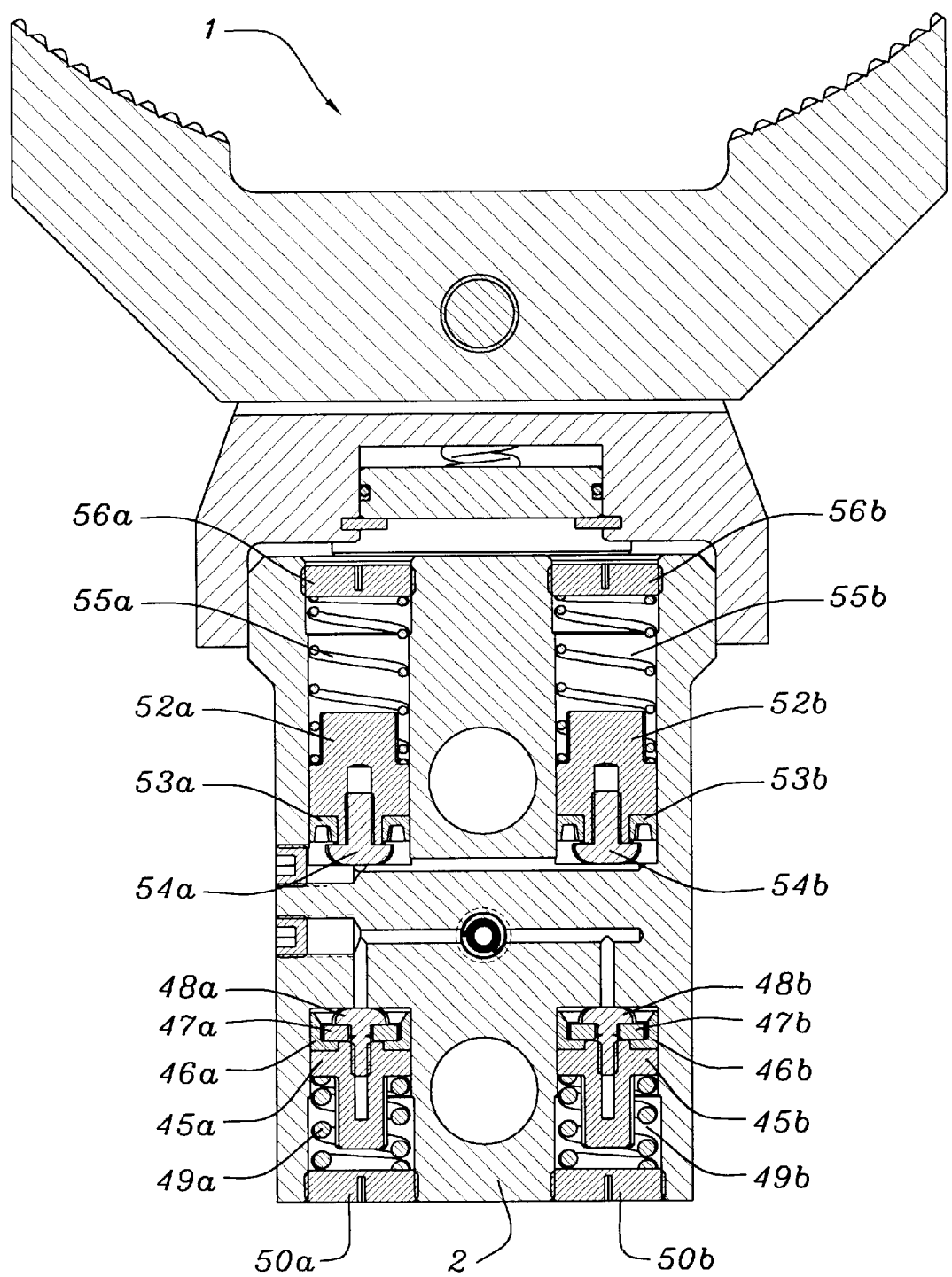
FIG. 11 is a sectional view of the jaw assembly of the present invention.

FIG. 11 is a sectional view of the jaw assembly 1. Inside the jaw assembly 1 are the pair of spring-loaded metering reservoirs, comprising metering pistons 45a, 45b, cup seals 46a, 46b, washers 47a, 47b, button head cap screws 48a, 48b, compression springs 49a, 49b and adjusting caps 50a, 50b, and the pair of spring loaded holding reservoirs, comprised of holding pistons 52a, 52b, cup seals 53a, 53b, button head cap screws 54a, 54b, compression springs 55a, 55b and adjusting caps 56a, 56b.

Figure 12:
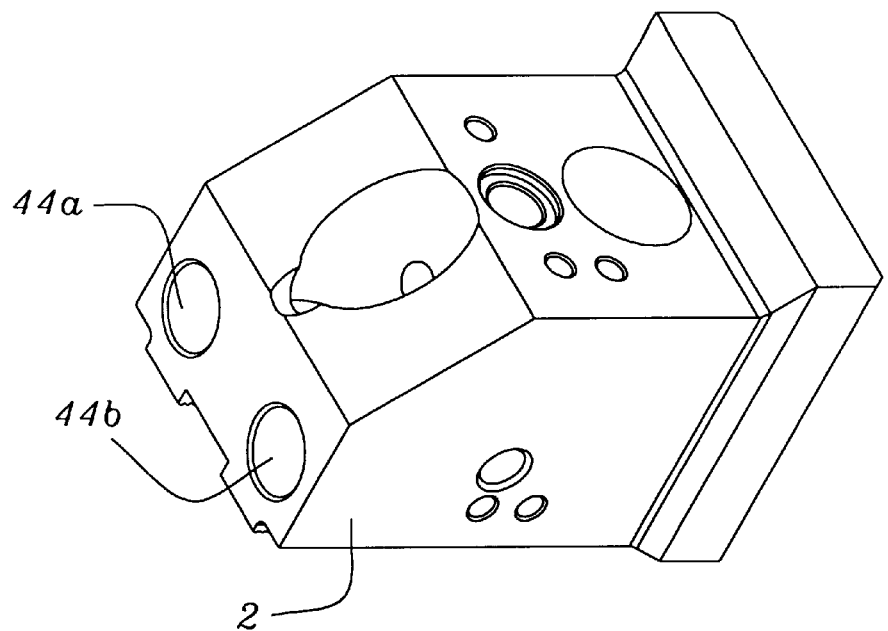
FIG. 12 is an isometric view of the back of the base jaw of the present invention.

In FIG. 12, the base jaw 2 has cylinder bores 44a, 44b, of the spring-loaded metering reservoirs.

Figure 13:
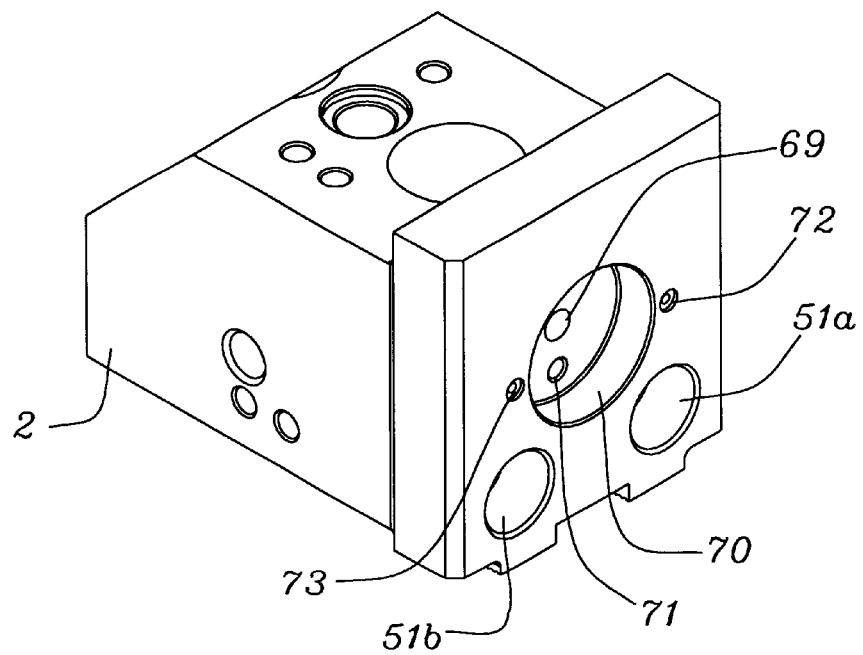
FIG. 13 is an isometric view of the front of the base jaw of the present invention.

The view in FIG. 13 shows cylinder bores 51a, 51b of the spring-loaded holding reservoirs. The hole 69 is for a socket head cap screw 65 (not shown), which connects the piston 3 (not shown) to base jaw 2. Piston 3 (not shown) is located in hole 70 and aligned with dowel pin 66 (not shown) in hole 71. Holes 72 and 73 are hydraulic oil passages to the ball valve assembly 28 (not shown) from piston 3 (not shown).

Figure 14:
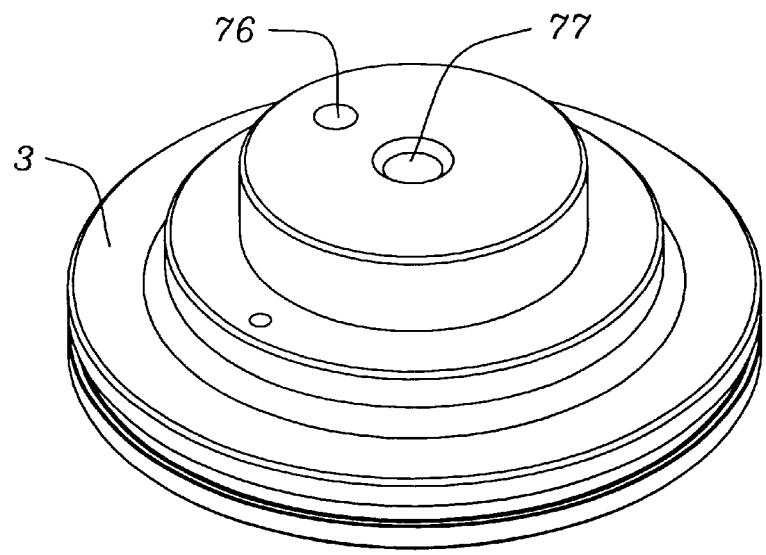
FIG. 14 is an isometric view of the piston in the hydraulic system of the present invention.

FIG. 14 shows the piston 3, with threaded fixing hole 77 and alignment hole 76.

Figure 15:
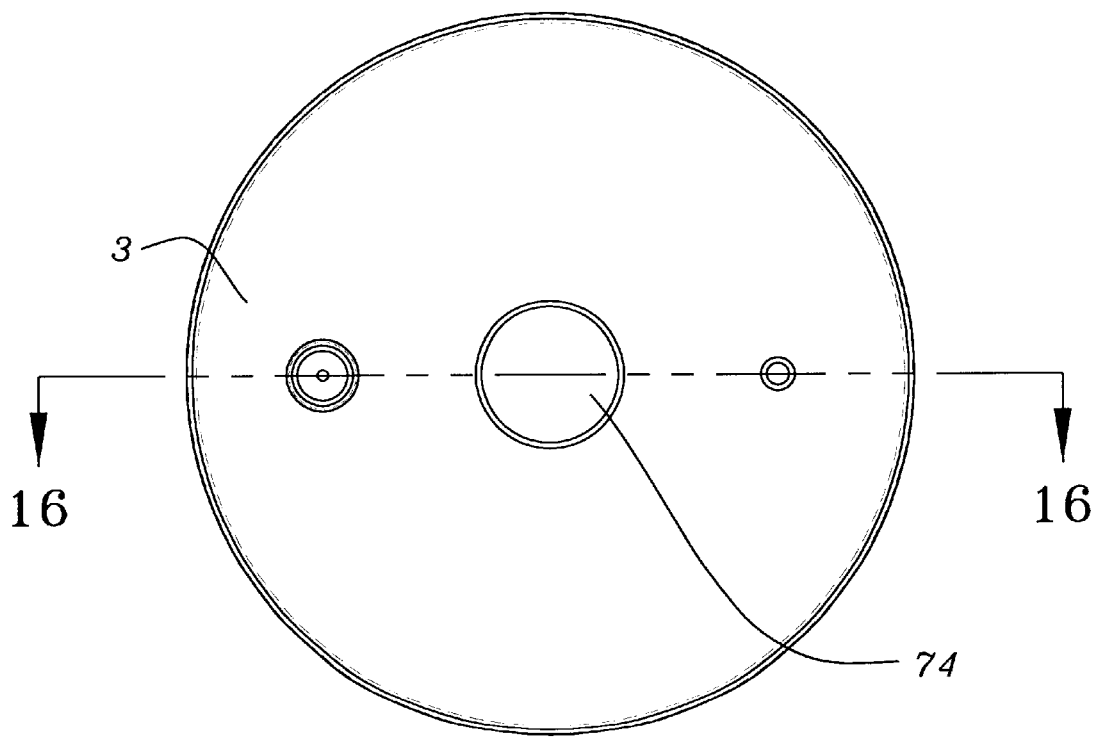
FIG. 15 is a front view of the piston in the hydraulic system of the present invention.

In FIG. 15, the front view of the piston ,3 shows the hole 74 for spring 68 (not shown) and cutting line 16.

Figure 16:
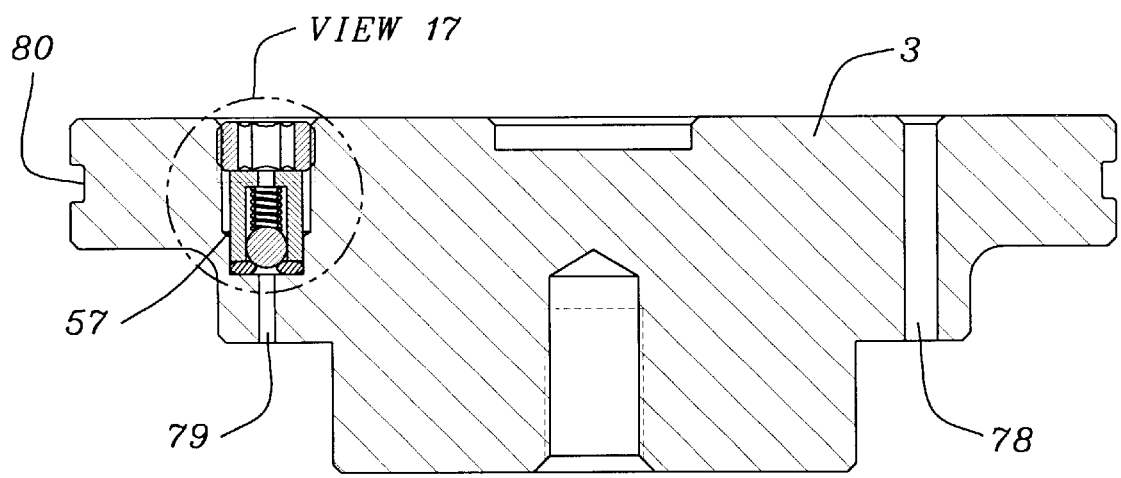
FIG. 16 is a sectional view of the piston in the hydraulic system of the present invention.

FIG. 16 shows the piston 3 with hole 78 and hole 79, which mate to hole 72 and 73 in the base jaw 2 (not shown) and O-ring groove 80. Also shown is the check valve assembly 57 inside the piston 3 as detail 17.

Figure 17:
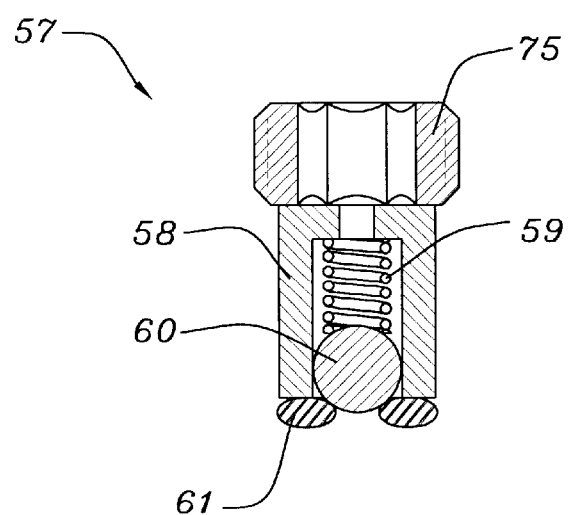
FIG. 17 is a sectional view of the check-valve assembly in the hydraulic system of the present invention.

The detail drawing, FIG. 17 shows the check valve assembly 57, comprising a check valve cage 58, compression spring 59, ball 60, O-ring 61 and hollow setscrew 75.

Figure 18:
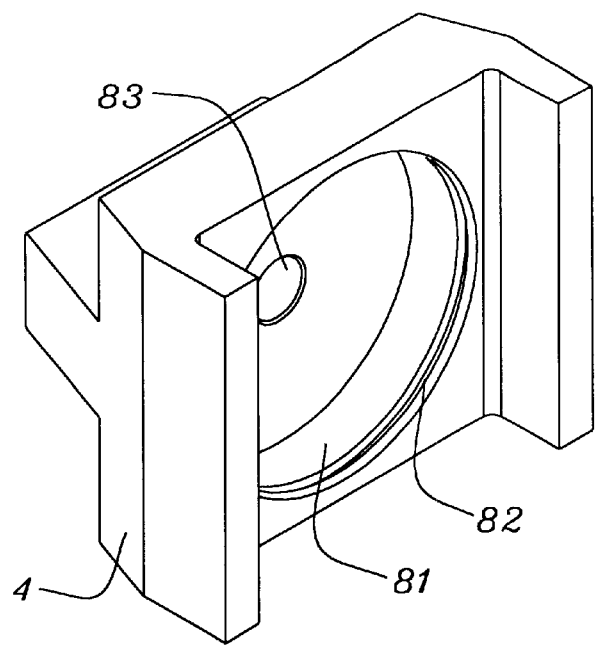
FIG. 18 is an isometric view of the back of the connecting block of the present invention.

As shown in FIG. 18, the connecting block 4 has the cylinder 81, spiral ring groove 82 for spiral ring 67 (not shown) and hole 83 for spring 68 (not shown).

Figure 19:
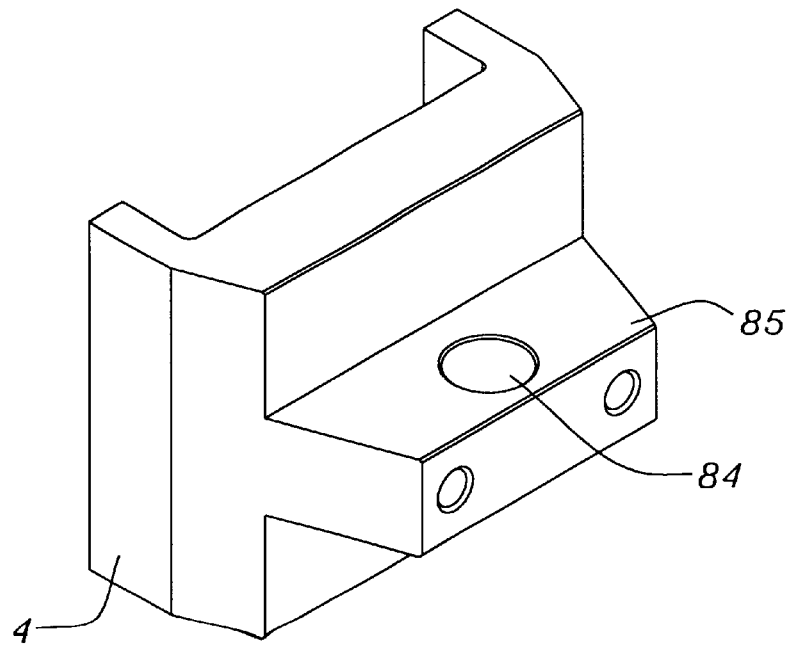
FIG. 19 is an isometric view of the front of the connecting block of the present invention.

The view in FIG. 19 shows the connecting block 3 with the swivel hole 84 for shoulder bolt 7 (not shown) and locating surface 85 to locate a swivel insert 5 (not shown).

Figure 20:
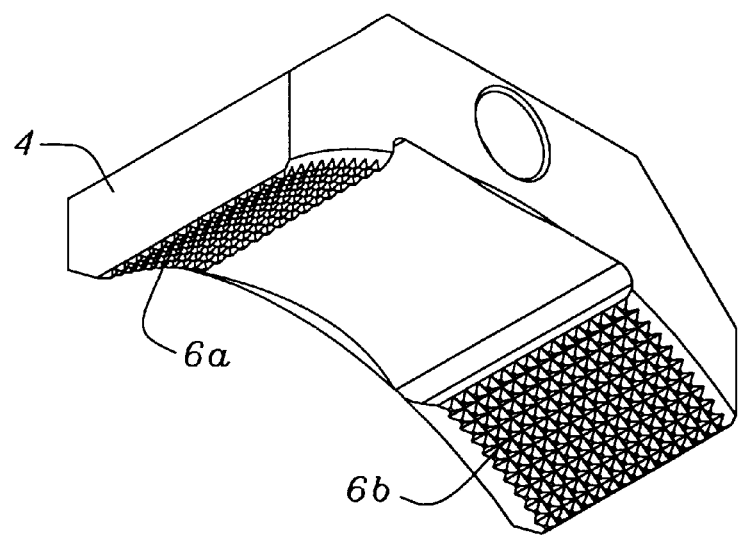
FIG. 20 is an isometric view of the front of the swivel insert of the present invention, showing the gripping surfaces.

FIG. 20 shows the gripping surfaces 6a, 6b on the swivel insert 5, which make contact with the pip e (not shown) to be machined.

Figure 21:
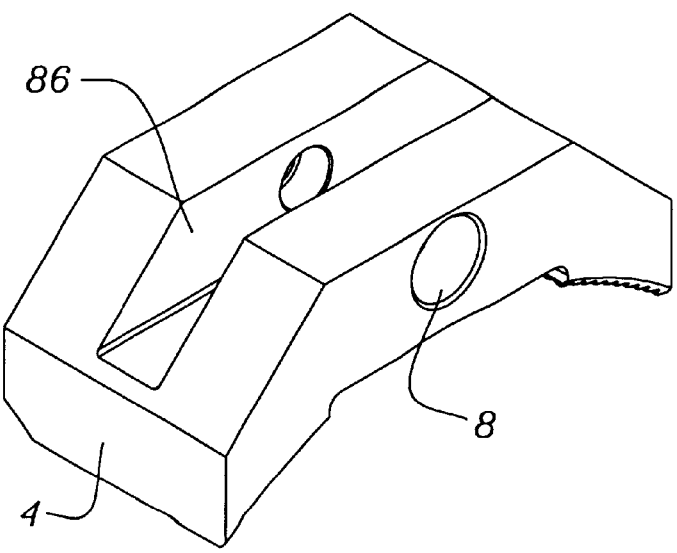
FIG. 21 is an isometric view of the back of the swivel insert of the present invention.

FIG. 21 shows the surface 86 on the swivel insert 5, which mates to surface 85 on the connecting block 3 (not shown). Hole 8 accommodates shoulder bolt 7 (not shown)

FIG. 22a through 22e represent the movements of a jaw assembly 1 when the hydraulic system is activated.

Figure 22A:
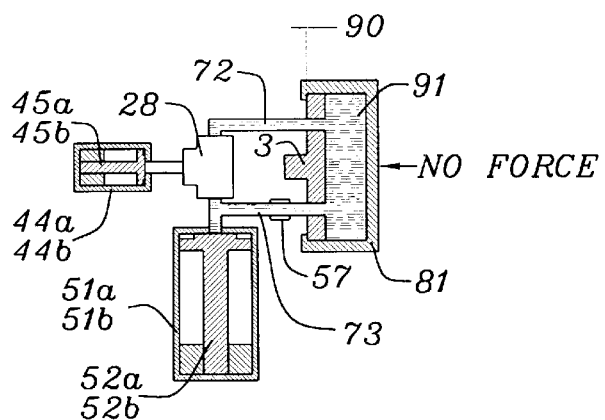
FIGS. 22a–22e is a series of diagrammatic views representing the stages of operation of the internal hydraulic system of the present invention.

In FIG. 22a, jaw assembly 1 is not clamped on a pipe (not shown). The ball valve assembly 28 is closed to oil passage 72; no force is present in an unclamped state.

Figure 22B:
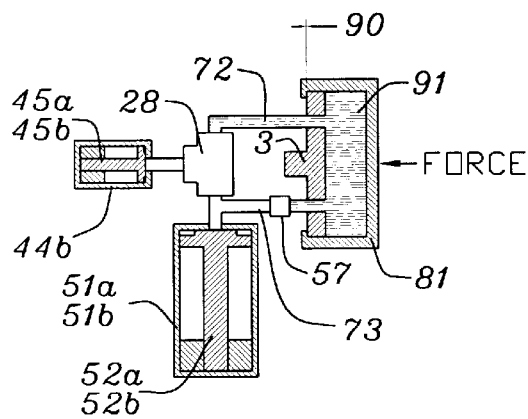

In FIG. 22b, clamping force is applied. The ball valve assembly 28 remains closed to oil passage 72. The clamping force pressurizes the hydraulic oil 91, which forces the check valve assembly 57 to close oil passage 73.

Figure 22D:
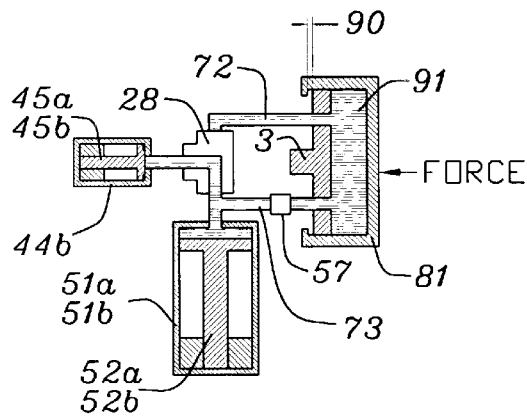
Figure 22C:
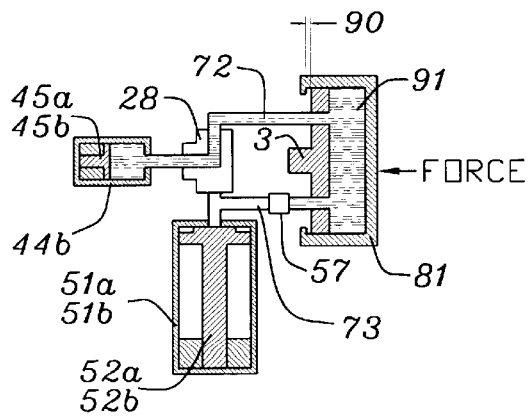

In FIG. 22c, with clamping force applied and the ball valve stem 30 (not shown) of the ball valve assembly 28 has rotated 90 degrees from the position in FIG. 24b, which is open to oil passage 72, diverting oil 91 from cylinder 81 to the cylinders 44a, 44b. The volume of oil 91 diverted from cylinder 81 moves the connecting block 4 (not shown) toward the base jaw 2 (not shown) the distance 90. The distance 90 can be pre set by adjusting the area in the cylinders 45a, 45b with the adjusting caps 50c, 50d (not shown).

FIG. 22d with clamping force applied and the ball valve stem 30 (not shown) of the ball valve assembly 28 has rotated 180 degrees from the position in FIG. 22b, which is open to oil passage 72, diverting oil 91 from cylinders 44a, 44b to cylinders 51a, 51b where the oil 91 is stored until the jaw assembly 1 (not shown) is unclamped or force is no longer applied.

Figure 22E:
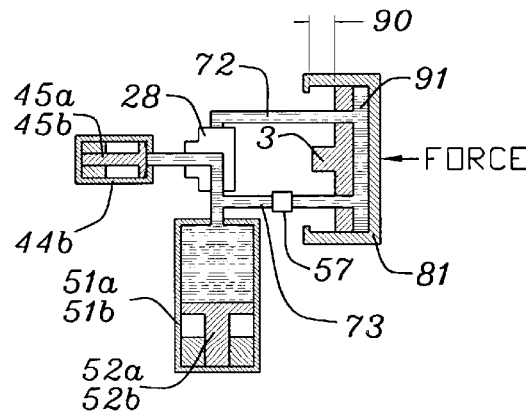

FIG. 22e shows the state of the hydraulic system after the ball valve stem 30 (not shown) of the ball valve assembly 28 has been rotated several revolutions.

When the jaw assembly 1 (not shown) is unclamped or when no force is applied, the hydraulic system returns to the state shown in FIG. 22a.

I claim:

1. A method of moving a clamped irregular workpiece to an axial centerline of a power chuck on a machine tool comprising:
   mounting at least two jaw assemblies onto the power chuck, each of the jaw assemblies having a length and comprising:

a base jaw;
a piston mounted onto the base jaw
a connecting block with a cylinder, the connecting block having a cylinder bore disposed around the piston;
a swivel insert connected to the connecting block by means of a shoulder bolt with an axis, the swivel insert being rotatable about the axis of the shoulder bolt; and
an internal hydraulic system filled with hydraulic oil, the hydraulic system having a check valve;
pressurizing the internal hydraulic system of each of the jaw assemblies by clamping the workpiece in the power chuck;
actuating the internal hydraulic:system to reduce the length of at least one of the jaw assemblies, thereby moving the clamped workpiece to the axial centerline of the power chuck.

2. The method of claim 1 which further includes the step of unclamping the workpiece in the power chuck, thereby automatically restoring the length of each of the jaw assemblies.

3. The method of claim 1 wherein the base jaw further comprises: a diverting valve having a first port to the cylinder, a second port to a metering oil reservoir, and a third port to a holding oil reservoir; and the piston further comprises a first oil passage to the first port of the diverting valve and a second oil passage to the third port of the diverting valve, the second oil passage having the check valve; and wherein actuating the internal hydraulic system removes a predetermined amount of hydraulic oil from the cylinder to the metering oil reservoir, the hydraulic oil then being forced to the holding reservoir.

4. The method of claim 1 wherein the power chuck has master jaws, the master jaws being removed and replaced by jaw assemblies incorporating features of the master jaw.

5. The method of claim 1 wherein the swivel inserts have gripping surfaces for holding the workpiece.

6. The method of claim 2 wherein the length of each of the jaw assemblies is restored when the check valve opens, allowing the hydraulic oil to flow back to the cylinder.

7. The combination of at least two workholding jaw assemblies for use with a self-centering power chuck on a machine tool for machining a workpiece, each of the jaw assemblies having a length adjustable by means of an internal hydraulic system, each of the jaw assemblies comprising:
a base jaw mounted on the power chuck, the base jaw having a hydraulic diverting valve with a first port, a second port, a third port, and a series of oil reservoirs connected to the ports;
a piston affixed to the base jaw, the piston having a first oil passage to the first port of the diverting valve and a second oil passage to the third port of the diverting valve, the second oil passage having a hydraulic check valve assembly;
a connecting block with a cylinder, the connecting block having a cylinder bore disposed around the piston, the connecting block being held in alignment by the base jaw;
a swivel insert connected to the connecting block by means of a shoulder bolt with an axis, the swivel insert being rotatable about the axis of the shoulder bolt; and
hydraulic oil filling the internal hydraulic system;
the jaw assemblies being positioned on the power chuck, and the internal hydraulic system of each of said jaw assemblies being pressurized by clamping the workpiece in the power chuck having an axial centerline, and the length of at least one of the jaw assemblies being reduced by actuating the diverting valve, thereby moving the workpiece to the axial centerline of the power chuck by hydraulic and mechanical means.

8. The combination of claim 7 wherein the power chuck has master jaws, the master jaws being removed and replaced by jaw assemblies incorporating features of the master jaws.

9. The combination of claim 7 wherein the swivel inserts have gripping surfaces for holding the workpiece.

* * * * *